UNITED STATES PATENT OFFICE.

ADOLF SPITTELER, OF PRIEN, GERMANY.

MANUFACTURE OF TRANSPARENT PRODUCTS FROM IMPURE PARANUCLEOPROTEIDS.

SPECIFICATION forming part of Letters Patent No. 672,541, dated April 23, 1901.

Application filed September 23, 1899. Serial No. 731,490. (Specimens.)

*To all whom it may concern:*

Be it known that I, ADOLF SPITTELER, chemist, a citizen of Switzerland, residing at Villa Bernhartzeder, Prien, Bavaria, Germany, have invented a certain new and useful Improvement in the Manufacture of Transparent Products from Impure Paranucleoproteids, (for which I have applied for British patent, dated August 31, 1899, No. 17,657, and German patent, dated July 14, 1899,) of which the following is a specification.

My invention is designed for the production of solid transparent paranucleoproteids, and resides in such products and in the process for obtaining the same.

Dried coagulated paranucleoproteids have been used as a substitute for horn, amber, and the like; but the commercial products hitherto obtained have been opaque, so that for many purposes they could not rival transparent materials. The reason for this is that commercial paranucleoproteids are impure, so that when they are dissolved they yield turbid solutions which cannot be cleared by any means hitherto known, the result of which is that the dried and coagulated products obtained from these solutions are opaque. By my invention, however, the particles which produce the turbidity in the solutions of commercial paranucleoproteids, such as ordinary casein, may be precipitated by caustic alkali and a perfectly clear solution of the casein obtained, the dried coagulated products from which clear solution are transparent.

It is well known that caustic alkali is a solvent of impure casein, producing what may be termed "casein alkali;" but the solutions formed thereby, as well as by other well-known solvents of casein, are turbid. To such a turbid solution of impure casein I add such a quantity of caustic alkali as may be required to cause the solution to split up into a clear liquid containing the casein and into a precipitate containing the turbid or non-transparent particles. As a matter of fact, I perform both operations of dissolving the impure commercial casein and of causing the splitting up and separation of the turbid particles from the solution in a single step by using such a proportion of caustic alkali to the casein as shall be much in excess of that required to form casein alkali. The first action of the alkali upon the casein is to form a turbid solution of the same, and the next action of the same is that of a chemical reagent acting upon the solution first formed to cause the precipitation of the impurities or turbid particles therein. After allowing the liquid to stand for a short time the matter causing the turbidity settles and I obtain above the sediment a clear solution of casein.

As above stated, any turbid solution of casein, even milk, may be treated in the manner described; but it is generally customary to start the manufacture of casein products from the crude solid material, and as a very good solvent for this is caustic-alkali solution the casein may be dissolved and cleared in a single operation.

I treat the impure casein with a comparatively strong solution of caustic alkali, such as one containing five per cent. of alkali, care being taken that the quantity of alkali used is far in excess of that required to dissolve the casein. When the clear solution has been obtained in the manner set forth, it may be readily separated from the sediment or precipitate by filtration, decantation, or other suitable means, and from the clear solution the casein is separated by coagulation or other known means—as, for example, by acetic acid—and dried and worked up into solids which are perfectly transparent.

The following example illustrates the process: Dry casein, preferably finely divided, is mixed with two or three times its weight of water and left until it has begun to swell. Alkali is then added to the extent of about ten per cent. (calculated as $Na_2O$) of the weight of the dry casein and in the form of a solution of five-per-cent. strength. The mixture is well stirred and left until the jelly at first formed has separated into a clear solution and a sediment. This occurs in about two hours, when the strength and proportion of the alkali are those named; but the time varies within wide limits, according as these conditions are changed. When the amount of clear liquid no longer increases, the solution is decanted or siphoned from the sediment, and the casein is separated from it in any known manner and dried.

Having now described my invention, what I claim as new, and desire to secure by Letters Patent, is—

1. Solid paranucleoproteids characterized by transparency.

2. The process of obtaining solid transparent products from impure paranucleoproteids, which consists in adding to a turbid solution of an impure paranucleoproteid an alkali of suitable concentration, thereby causing the precipitation of the particles which produce the turbidity and the formation of a clear solution above the same, separating said particles from the clear solution, and treating said clear solution in suitable manner to obtain the transparent products.

3. The process of obtaining solid transparent products from impure paranucleoproteids, which consists in adding to an impure paranucleoproteid a solution of caustic alkali of suitable concentration much in excess of that required to dissolve the paranucleoproteid, thereby obtaining a precipitate and a clear solution above the same, separating the precipitate from the clear solution, and finally treating the clear solution to obtain the transparent products.

In testimony whereof I have hereunto set my hand in presence of two subscribing witnesses.

ADOLF SPITTELER.

Witnesses:
JULIUS HARTMANN,
R. J. ROST.